(12) United States Patent　　(10) Patent No.: US 9,709,024 B2
Duke　　(45) Date of Patent: Jul. 18, 2017

(54) VORTEX ENERGY RECOVERY TURBINE

(71) Applicant: John Hincks Duke, Providence, RI (US)

(72) Inventor: John Hincks Duke, Providence, RI (US)

( * ) Notice: Subject to any disclaimer, the term of this patent is extended or adjusted under 35 U.S.C. 154(b) by 992 days.

(21) Appl. No.: 13/860,493

(22) Filed: Apr. 10, 2013

(65) Prior Publication Data

US 2014/0308111 A1　Oct. 16, 2014

(51) Int. Cl.
*F03B 17/06*　(2006.01)

(52) U.S. Cl.
CPC ........ *F03B 17/061* (2013.01); *F05B 2240/34* (2013.01); *F05B 2240/97* (2013.01); *Y02E 10/28* (2013.01)

(58) Field of Classification Search
CPC F03B 17/061; F05B 2240/34; F05B 2240/97; F05B 2210/16; F05B 2250/611; Y02E 10/28; Y02E 10/721; F03D 1/0608

USPC .............................................. 416/1, 85, 120
See application file for complete search history.

(56) References Cited

U.S. PATENT DOCUMENTS

| | | | |
|---|---|---|---|
| 6,948,910 B2 * | 9/2005 | Polacsek | F03D 1/0608 416/1 |
| 2009/0196748 A1 * | 8/2009 | Salter | F03D 1/001 416/120 |

* cited by examiner

*Primary Examiner* — Mark Laurenzi
*Assistant Examiner* — Paul Thiede

(57) ABSTRACT

A free stream fluid kinetic energy conversion device combines a large diameter freewheeling primary rotor with small diameter secondary power takeoff rotors placed within the lift induced blade tip vortices of the primary rotor. This enables use of high rotational speed generating units and avoids diseconomy of scale in gearbox expense. The device partially recovers otherwise lost blade tip vortex energy. The freewheeling primary rotor transmits no reaction torque to the support structure. Resilient buoyant tether deployment accommodates transient eddy induced structural loads.

2 Claims, 5 Drawing Sheets

VORTEX ENERGY RECOVERY TURBINE

RELATED APPLICATIONS

This application claims benefit of U.S. Provisional Application Ser. No. 61/622,250 filed Apr. 10, 2012 fully incorporated herein by reference.

TECHNICAL FIELD

Aspects of the present invention are directed to conversion of hydrokinetic and wind energy to electrical energy.

BACKGROUND

Large scale economic conversion of rotary hydrokinetic power must address the challenge of extremely slow rotation with extremely high torque. Modern wind power conversion shares this challenge, but the higher viscosity of water imposes an even lower functional limit on turbine blade tip speed. Engineering designs to meet this challenge are high in cost, including large gear boxes, direct drive generating units, or hydraulic transmissions. This challenge increases with turbine diameter.

The present invention is a value engineering solution to enable economic deployment of large diameter horizontal axis hydrokinetic turbines. A large freewheeling turbine incorporates secondary turbines at the tips of its blades where localized energy density is greatest. In effect, this arrangement employs the ambient fluid as a planetary gear ring. The required generating units are economical high speed type.

The secondary turbines are positioned in way of the induced primary rotor blade tip vortices to partially recover that rotational energy. In this arrangement, vortex energy recovery provides the further benefit of dissipating vortex drag, which is otherwise a significant drag upon free stream energy conversion rotors.

Because no torque is translated through the primary turbine shaft, there is significant structural savings in avoided reaction torque support.

In the prior art, the Minesto Company has proposed a kite-turbine that also incorporates a secondary turbine. It flies in a dynamically controlled figure-eight path at reported speeds up to ten times the ambient current speed. In comparison, the present invention does not expend energy in tether motion and partially recovers induced wing tip vortex energy that is otherwise a source of drag.

The prior art describes means to recover wing-tip vortex energy in fixed wing aircraft, for example U.S. Pat. No. 4,428,711 to Archer, U.S. Pat. No. 4,917,332 to Patterson, U.S. Pat. No. 5,100,085 to Rubbert, U.S. Pat. No. 5,150,859 to Ransick, U.S. Pat. No. 5702,071 to Kroll et al., U.S. Pat. No. 5,918,835 to Gerhardt, and U.S. Pat. No. 5,934,612 to Gerhardt. For wind energy conversion, the prior art also describes means to convert induced vortex energy from other non-rotating forms, for example U.S. Pat. No 4,045,144 to Loth, U.S. Pat. No 4,105,362 to Sforza, and U.S. Pat. No. 7,131,812 to Brueckner. The present invention is distinguished by the combination of primary and secondary rotors in a single device.

DETAILED DESCRIPTION

Figure 1:
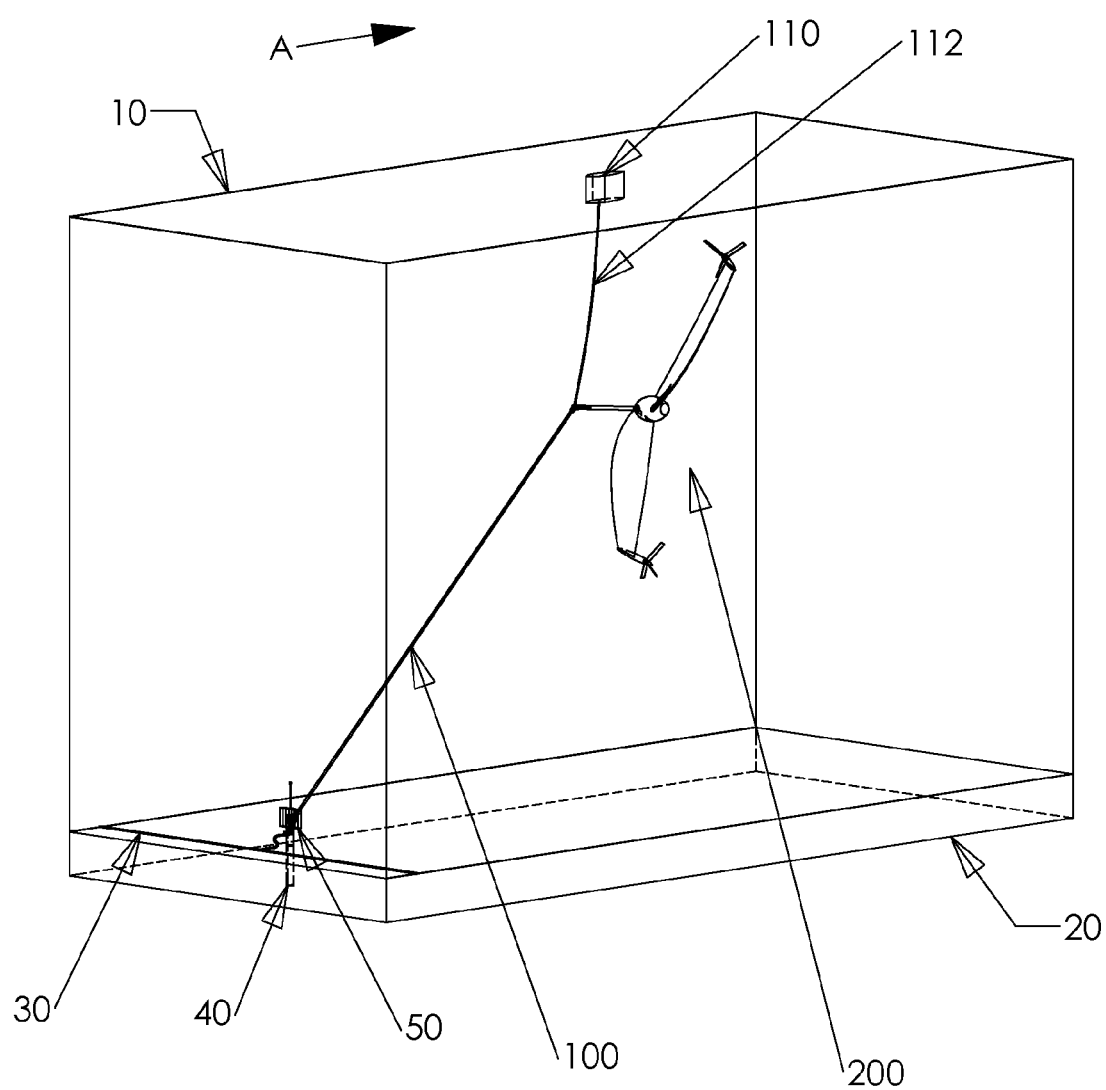
FIG. 1 is a perspective view of the turbine deployed in a water stream.

In FIG. 1, the turbine is deployed in a body of water 10 that flows in a direction A over a horizontal seafloor surface 20. An electrical conductor 30 connects to a substantially vertical cylindrical piling 40. Piling 40 supports an electricity conducting link 50 that rotates freely about a substantially vertical axis. Link 50 further connects to a first end of a tether 100 that rotates freely about a substantially horizontal axis. Tether 100 is approximately neutrally buoyant in water 10, resiliently maintains its elongated form, and incorporates an electrical conductor not shown. In the preferred embodiment tether 100 is constructed of tubular fiberglass with internal flotation. A buoy 110 floats at the surface of water 10 and supports a second end of tether 100 via a cable 112. The second end of tether 100 further connects to a freely rotating primary turbine 200 that is negatively buoyant in water 10.

Figure 2:
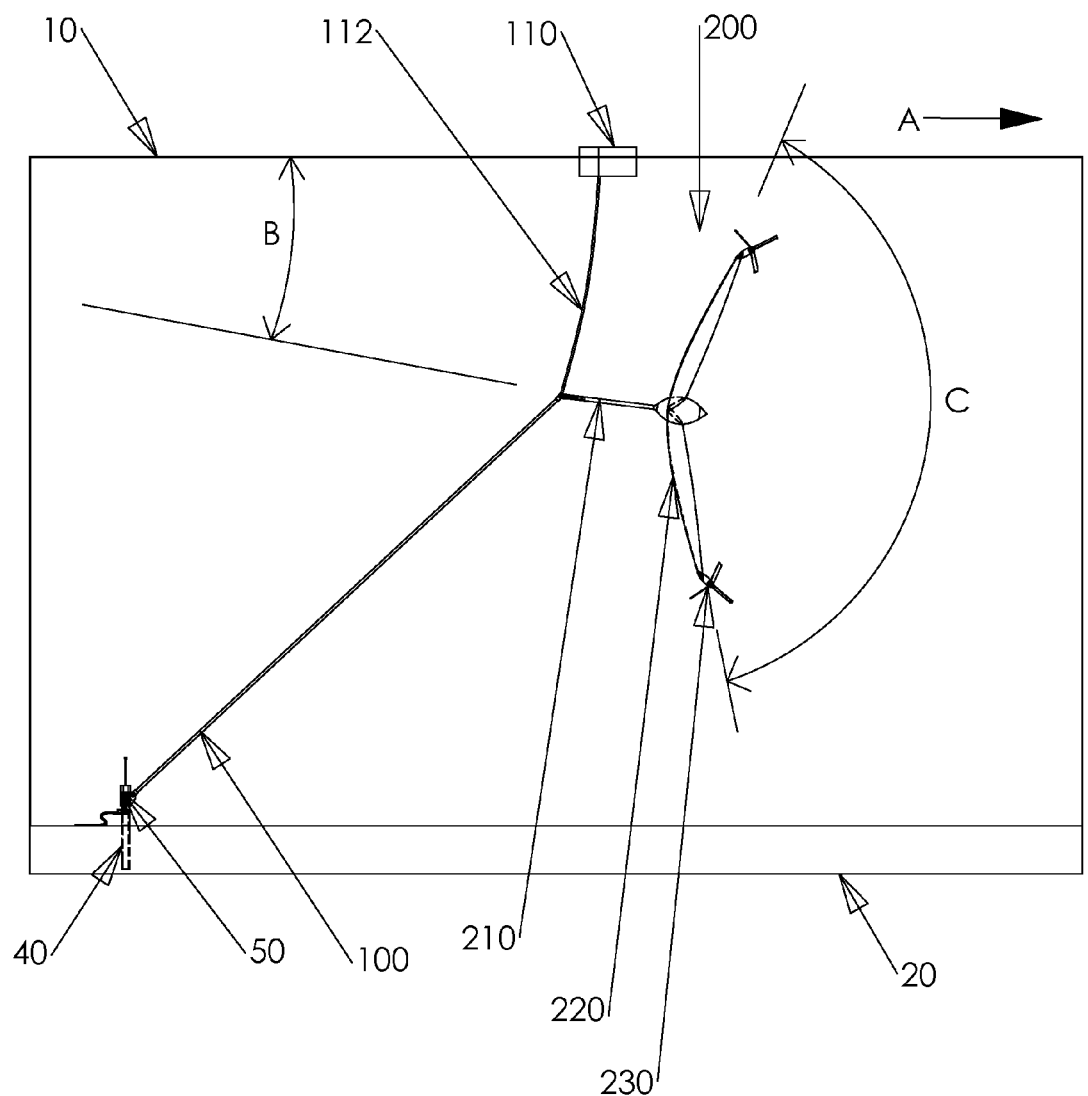
FIG. 2 is a cross-stream view.

FIG. 2 further shows turbine 200 incorporating a shaft 210 aligned with its axis of rotation at an angle B with respect to the surface of water 10. A set of two or more foils 220 diverge from the downstream end of shaft 210 at a dihedral angle C. The distal ends of foils 220 respectively support a set of secondary turbines 230.

Figure 3:
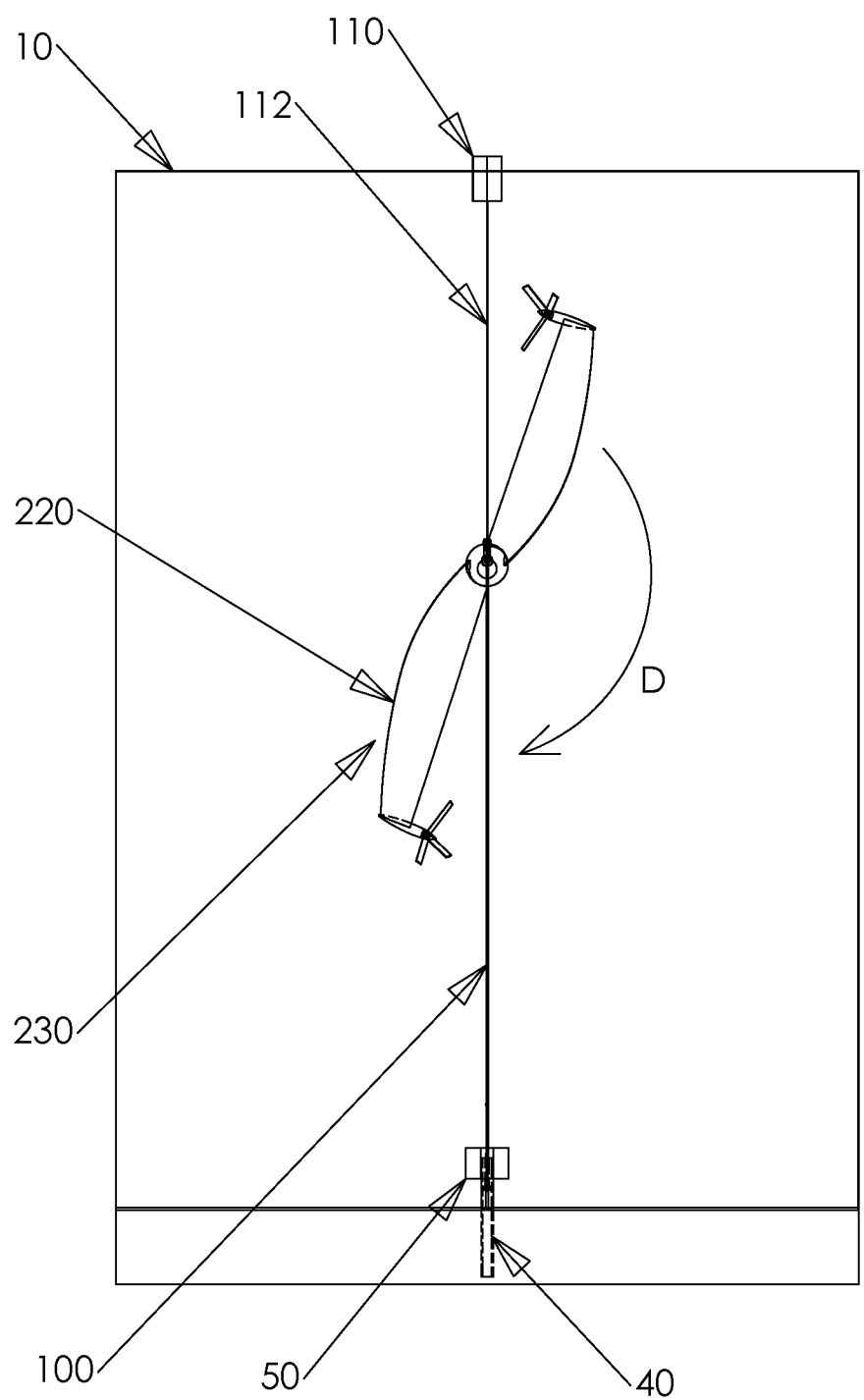
FIG. 3 is a down-stream view.

FIG. 3 further shows turbine 200 rotating in a direction D.

Figure 4:
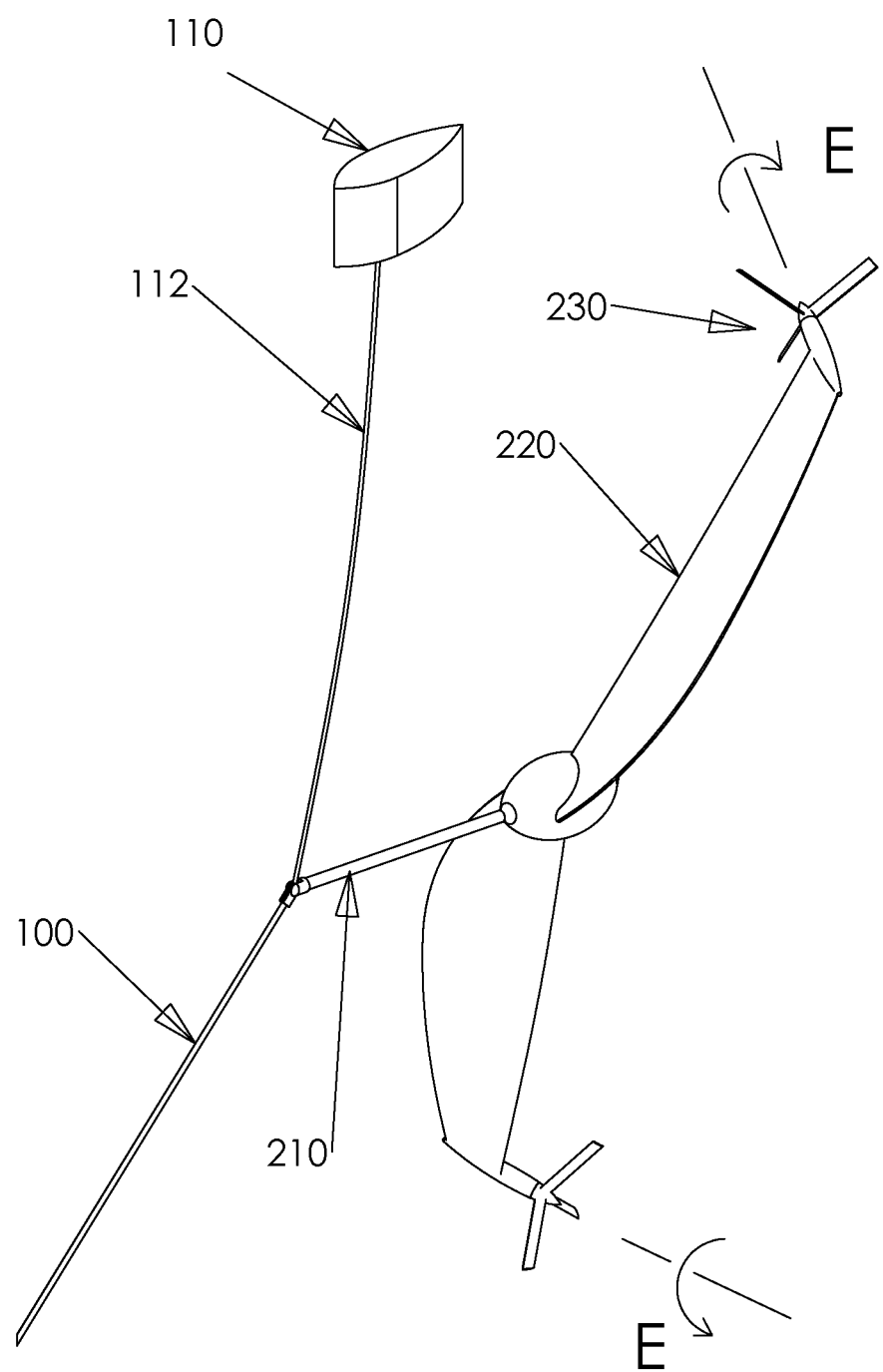
FIG. 4 is a detail view indicating induced vortex rotation.

FIG. 4 further shows a vortex rotation direction E at the respective distal ends of foils 220, where known vortex flow is from the high pressure sides to the low pressure sides of foils 220. Secondary turbines 230 are substantially co-axial with the axis of vortex rotation and also rotate in direction E. Secondary turbines 230 incorporate known electricity generators not shown. Known electricity conductors not shown convey generated power to tether 100 through known rotary contacts.

In an alternative embodiment, secondary turbines 230 incorporate high pressure positive displacement pumps not shown, which convey power through a known alternate fluid circuit.

Figure 5:
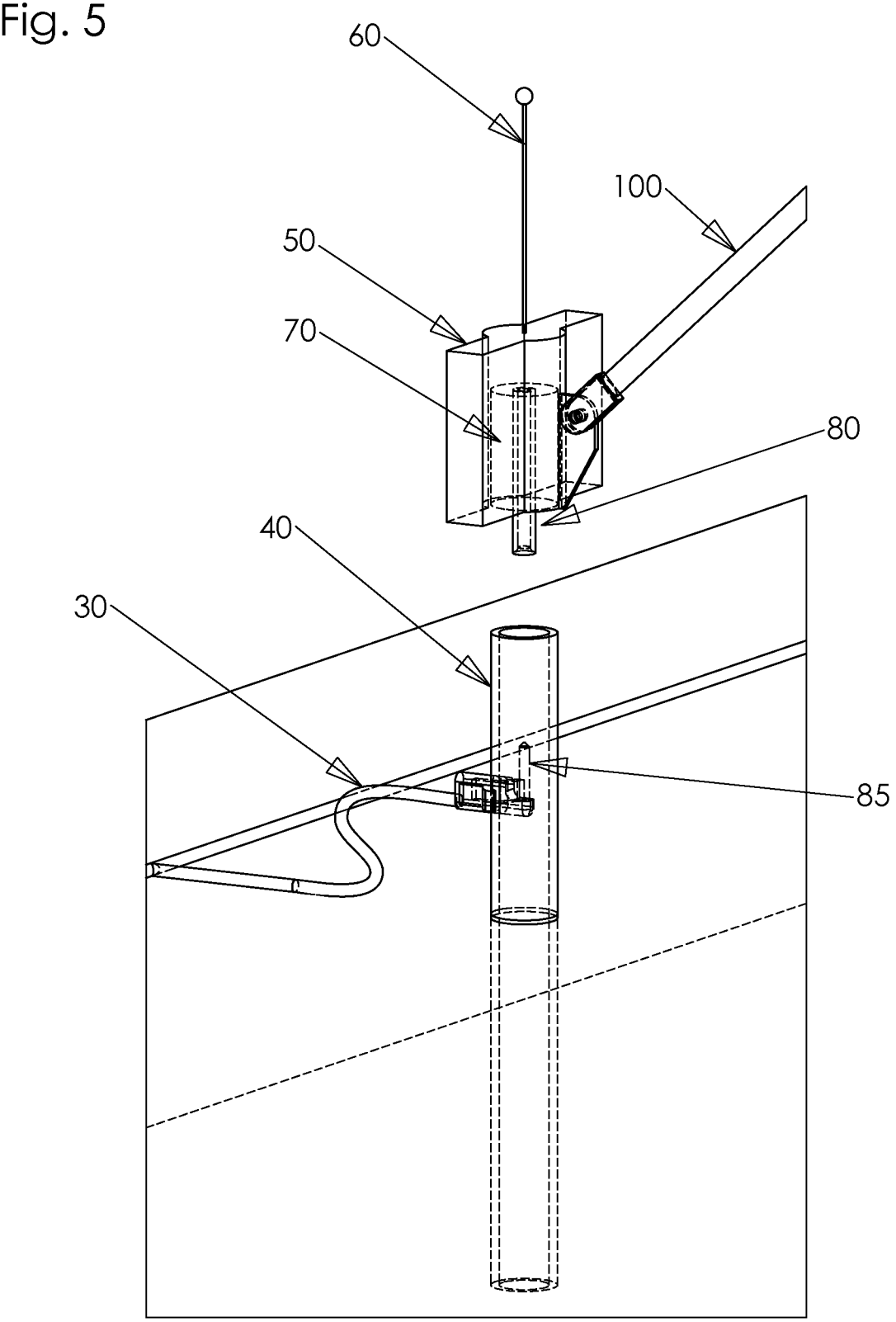
FIG. 5 is an exploded detail view of the preferred seafloor attachment means.

Lastly, the exploded view in FIG. 5 further shows a lift cable 60 that projects upwards from link 50. A cylindrical cavity 70 within link 50 receives the upper end of piling 40 when operating. In the preferred embodiment the mass of link 50 is sufficient to gravitationally maintain that position. A female electrical contact 80 projects downward within cavity 70 substantially concentric with cavity 70. A male electrical contact 85 is integral to connector 30 and projects upwards within piling 40 substantially concentric with piling 40. When operating contacts 80 and 85 rotatably engage each other.

Operation

To place into or remove from service, a vessel not shown engages lift cable 60 to lower or lift cavity 70 onto or off of piling 40.

During natural intervals of slow current in direction A, the inherent stiffness of tether 100 prevents entanglement with or adverse disruption of sea floor 20.

During natural intervals of slow current in direction A, negative buoyancy of turbine 200 causes an increase in angle B, which avoids entanglement of turbine 200 with both tether 100 and cable 112.

During natural intervals of changes in current direction A, the inherent stiffness of tether 100 translates drift motion of the device into rotation of link 50 upon piling 40.

When generating power, negative buoyancy of turbine 200 balances current drag force on turbine 200 to maintain angle B. When at angle B, dihedral angle C causes foils 220 to be more normal to direction A in the lower portion of their rotations, where current velocity is naturally lower, and less normal to direction A in the upper portion of their rotations, where current velocity is naturally higher.

Dihedral angle C further acts to shed jetsam that may entangle the device.

Rotation of turbine 200 in direction D causes increased resultant current velocity at the distal ends of foils 220 where secondary turbines 230 operate. This localized increase in energy density enables economic power conversion. Because secondary turbines 230 operate in rotating fluid, their blade angle of attack is higher than in linear flow, which results in higher torque generation. Also, local pressure drop in the trailing vortex cores acts to draw water 10 through secondary turbines 230. In these ways, rotational direction E vortex energy is partially recovered by co-rotation of secondary turbines 230.

Because power conversion in secondary turbines 230 is integral to their respective foils 220, no torque is translated into shaft 210, which results in manufacturing economy.

I claim:

1. A free stream fluid kinetic energy conversion device deployed in an environment that contains a fluid, comprising:

a primary rotor including two or more lift producing foils that rotate to develop a respective trailing vortex at each distal end of said two or more lift producing foils in response to a flow of the fluid being received by the primary rotor, and a secondary rotor deployed within each trailing vortex, wherein:

said secondary rotors are further respectively positioned substantially coaxial to their corresponding said trailing vortex, and said secondary rotors respectively rotate in the same direction as their corresponding said trailing vortex, and said secondary rotors drive integral electric generators.

2. The energy conversion device of claim 1, wherein the environment is a water environment including a floor, and the energy conversion device is deployed in the water, and the energy conversion device further includes:

a neutrally buoyant resilient tether disposed in the water and having communication with the primary rotor, the neutrally buoyant resilient tether opposing a drag force in said flow of the water, wherein a lower end of said neutrally buoyant resilient tether is pivotably attached to the floor and an upper end of said neutrally buoyant resilient tether is vertically supported by a cable attached to a water surface buoy.

* * * * *